(12) United States Patent
Beck et al.

(10) Patent No.: US 6,234,708 B1
(45) Date of Patent: May 22, 2001

(54) MOUNTING FOR JUMPS

(76) Inventors: Bernd Beck, Schneeglöckchenweg 4, D-35794 Mengerskichen; Michael Beck, Steinstrasse 3, D-35794 Mengerskirchen; Volker Beck, Beethovenstrasse 3, D-65545 Limburg, all of (DE)

( * ) Notice: Subject to any disclaimer, the term of this patent is extended or adjusted under 35 U.S.C. 154(b) by 0 days.

(21) Appl. No.: 09/309,118

(22) Filed: May 10, 1999

(30) Foreign Application Priority Data

May 13, 1998 (DE) .............................................. 198 21 398

(51) Int. Cl.$^7$ ................................. F16B 9/02; A63K 3/04
(52) U.S. Cl. .................................. 403/353; 403/DIG. 3; 248/221.12; 248/223.21; 482/16; 119/705
(58) Field of Search ..................................... 403/353, 237, 403/232.1, DIG. 3; 248/225.11, 222.41, 223.21, 221.12, 218.4, 219.1, 219.3, 219.4; 119/705; 482/15, 16, 17

(56) References Cited

U.S. PATENT DOCUMENTS

| 3,741,405 | * | 6/1973 | McConnell et al. | 211/192 |
| 3,749,344 | * | 7/1973 | Racina | 248/218.4 |
| 4,368,875 | * | 1/1983 | Weiss et al. | 256/59 |
| 4,655,158 | * | 4/1987 | Holder | 403/DIG. 3 |
| 4,989,821 | * | 2/1991 | Wong | 248/529 |
| 5,350,073 | * | 9/1994 | Thornley et al. | 211/187 |
| 5,653,349 | * | 8/1997 | Dana et al. | 248/221.12 |
| 5,690,583 | * | 11/1997 | Keusch | 482/16 |

FOREIGN PATENT DOCUMENTS

| 43 05 550 | 8/1994 | (DE) . |
| 2105328 | 9/1979 | (GB) . |

* cited by examiner

Primary Examiner—Harry C. Kim
(74) Attorney, Agent, or Firm—Killworth, Gottman, Hagan & Schaeff LLP

(57) ABSTRACT

A mounting for poles of jumps in equestrian sport, with a dish-shaped pole receiver which is suspended on a generally vertical rail adapted to be fixed to a stand. The pole receiver and the rail can be connected together by bolts which extend in one or more multi-segmented slots having one or more serially connected narrow, wide and further narrow portions. The bolts are flanged, or headed such that the shaft is not as wide as the head. The width of the narrow portion of the slot corresponds to approximately the width of the bolt shaft, while the wide portion of the slot is wide enough to accommodate the bolt head. The slot is able to secure the bolts by firstly introducing the bolt head into the wide portion of the slot, then engaging the shaft with the narrow part of the slot until the shaft comes in contact with the further narrow portion. The further narrow portion, on which the shaft rests, gives way under a pre-determined and relatively low vertical loading, so that the pole and pole receiver are forced downwards when this loading is exceeded, causing the shaft to deform the further narrow portion as it passes through. Consequent disengagement of the pole and pole receiver from the stand reduces the risk of injury to a horse and its rider, as well as destruction or damage to the pole mounting.

9 Claims, 7 Drawing Sheets

Figure 1:
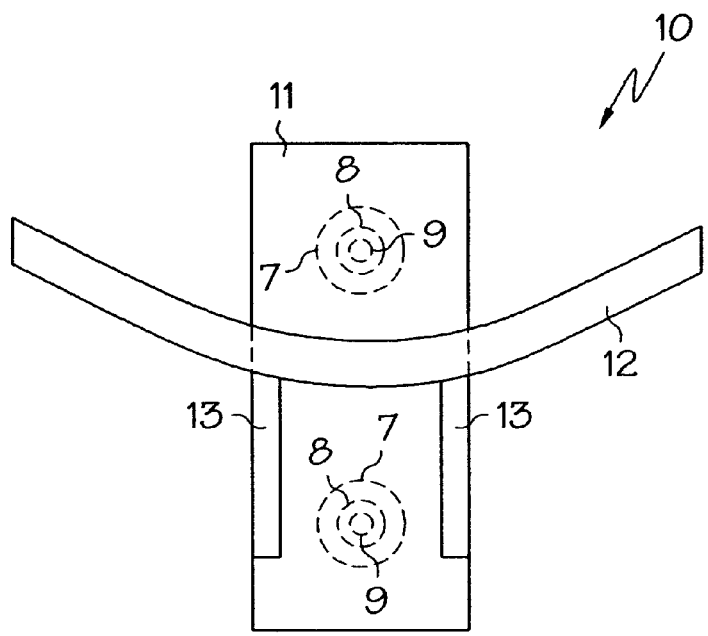

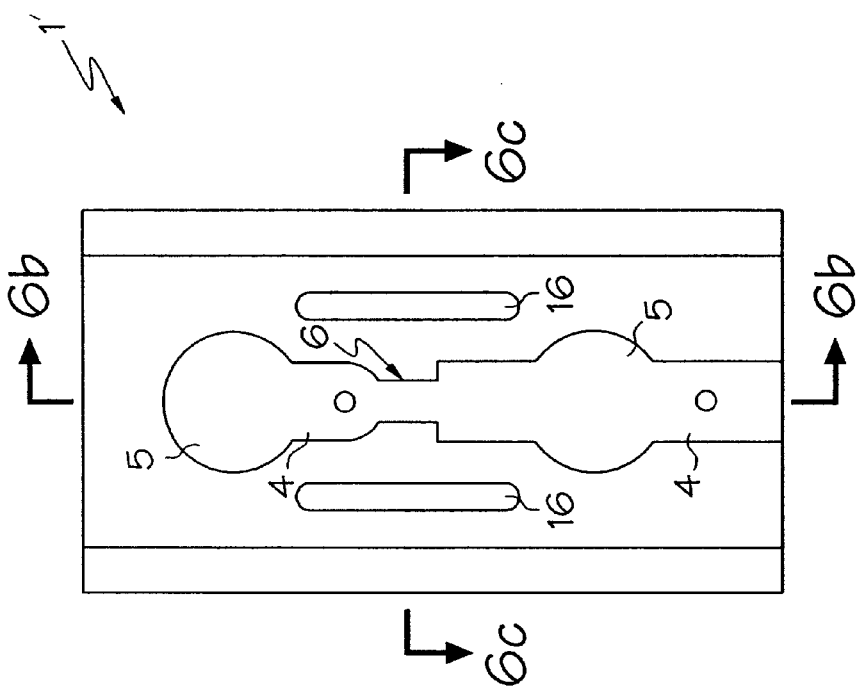
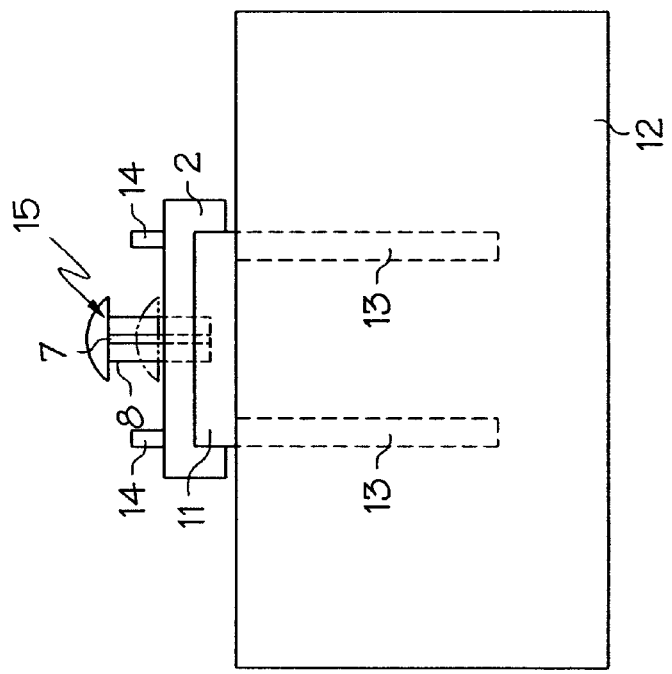
FIG. 6a
FIG. 5

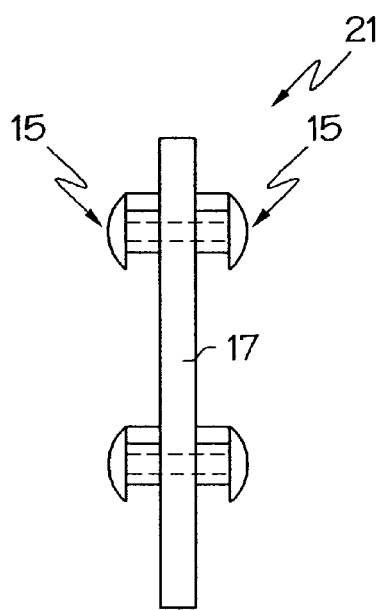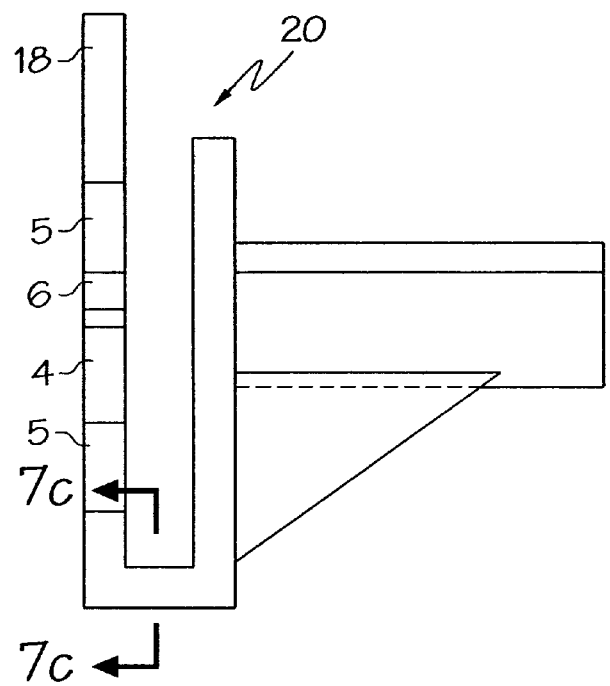
FIG. 7a                FIG. 7b
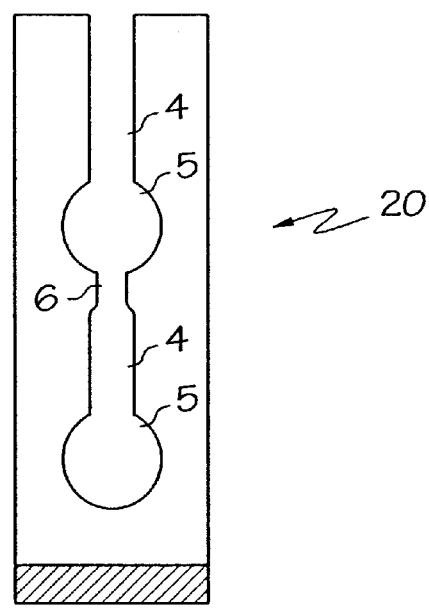
FIG. 7c

MOUNTING FOR JUMPS

The present invention relates to a mounting for poles of jumps in equestrian sport, with a dish-shaped pole receiver which is suspended on a generally vertically arranged rail of a stand, wherein the receiver and the rails are connected together by means of headed bolts which extend in slots from one of the two parts to the other of the two parts, and wherein the slots have narrow slot parts with a width corresponding to approximately the width of the shaft of the headed bolt, and less than the diameter of the head of the headed bolt, and have a widened part through which the heads of the headed bolts can be inserted in order, in this way, to be able to fit the headed bolts in the slots and be able to lock them by introducing them into the narrow part of the slot.

Such pole mountings used for jumps in equestrian jumping sports have long been known. The poles, generally manufactured from wood or aluminium, with a diameter in the order of 15 cm, are placed in the correspondingly concavely configured, dish-shaped support so that if a horse jumping over the jump hits the poles horizontally with its hooves, they will be moved forwards or backwards out of the dish-shaped receiver and fall down. This happens occasionally during "normal" jumping of a jump when the horse does not take off ideally such as, for example, taking off somewhat too shallow, to early or too late, or also hitting the jump with the rear hooves during jumping.

Occasionally a jump goes completely wrong, however, if the horse attempts either to stop in front of the jump at the last moment, or takes off far too early or far too late, although all of this may also be caused by mistakes on the part of the rider. In such cases, the horse may, under certain conditions, enter with its hooves deep in between the jump poles and may possibly also place a heavy load on them with the weight of its body and will then generally slip off the poles. These are relatively dangerous situations for the horse and rider which carry a considerable risk of injury.

In order to avoid this danger, rules have already been imposed for the suspension of jumps, which, inter alia, provide that the headed bolts with which the receivers are suspended on the stands must break or shear at a shearing force of approximately 800 kg. Meanwhile new regulations have also been imposed which instruct that in future the pole mounting must give way and release the pole at a vertical loading of only 140 kg.

A corresponding weakening of the headed bolts on which the pole receiver is suspended would, however, significantly limit the serviceability of corresponding receivers, as loadings of 140 kg can also occur during the handling of the receivers, stands and jump poles, that is to say, for example, during the assembly and disassembly of jumps, that is to say not only when a horse jumps or enters into the jump.

With respect to the prior art, the object of the present invention is therefore to provide a mounting with the features described in the introduction, with which the criteria set out can easily be satisfied, that is to say which gives way at a pre-determined and relatively low vertical loading, so that the poles and the pole receivers are released downwards when this loading is exceeded, whereby destruction of or damage to the pole mounting will be avoided as far as possible.

This object is solved in that at the end facing away from the widened part, the slots are open and in the form of a slot section which is, narrowed further compared to the narrow slot section, the width of which is dimensioned such that the bolts or bolt shafts received in the narrow part of the slot are only moveable into this narrowed section of the slot and through the open end of the slot by overcoming the pre-determined force acting in the longitudinal direction of the slot.

In contrast to the prior art, in which the headed bolts engaged in slots closed at both ends so the headed bolts could only be moved out of the slots by lifting of the heads of the bolts through the widened part, and not, however, in the longitudinal direction of the slot, the present invention provides that the slots receiving the headed bolts are open in the direction of the vertical loading occurring, but only in the form of a narrowed section of the slot which is narrower than the shaft of the bolt, so that under normal loading, that is to say under the weight of the jump pole and even when a person of normal build sits on the jump pole, said bolt cannot move into and through this narrow slot section. Only when a pre-determined loading limit is reached does the narrowed section of the slot widen out under the force of the bolt shaft pushing into this section and allow the bolt shaft to pass through, so the pole mounting is consequently released from the stand and the pole therefore falls down or is pushed downwards. In this way, the risk of injury to the horse is reduced, falls can be more easily avoided, and consequently such a situation is also less dangerous for the rider.

The rails or a corresponding section of the rails provided with the corresponding slots can, in accordance with an embodiment of the invention, be connected integrally with the pole mounting, on the side facing away from the dish-shaped pole receiver. The headed bolts would consequently be arranged on a stand and the slot would be open upwardly, so the mounting with the rail section fitted to it would be moved downwards under appropriate loading, wherein the bolts would be moved upwards, relative to the rail, out of the slots.

However, an embodiment of the invention is preferred in which the flexible connection according to the invention is effected by means of an interposed adaptor part, namely in that a conventional rail is used on a stand with a large number of vertical slots orientated one above another, in which the adaptor with headed bolts fitted to its rear side can be suspended in the usual manner at any desired height. The adaptor itself is then locked in the receiving slots of the stand, like a conventional pole support. On its side facing towards the pole support, however, the adaptor is provided with a rail or a rail section with the slot configuration according to the invention, so again, a conventional pole support can be suspended in these slots configured according to the invention of the adaptor.

The headed bolts are consequently firmly connected to the pole mounting. With this adaptor construction too, the coordination of slots and headed bolts could be reversed, in that the adaptor is provided with one or two headed bolts on its side facing towards the pole mounting, which in normal conditions of use can engage with upwardly open slots in a rail firmly connected to the receiver.

A headed bolt adaptor can also be used, that is to say a plate or a small block which has on each side one or, where necessary because of the dimensions, two or more headed bolts, wherein the headed bolts on one side could be suspended in a conventional stand rail, while the other bolt or bolts on the other side were suspended in rails provided according to the invention with one or more, in this case upwardly open, slots, on a pole mounting.

An embodiment of the invention is particularly preferred in which two bolts are provided in a mounting, provided at a vertical distance one above the other, and are fitted in particular onto the support. The headed bolts arranged one above the other at the same time in corresponding slots prevent twisting of the mounting or of the receiver about the axis of the bolt or an axis parallel to the bolt axis which would be possible if only a single bolt were used. With this configuration, it is useful, however, when only one of the two slots in which the headed bolts are received is provided with the narrowed slot section which widens out at the pre-determined force of pressure in order to allow the bolt shaft to pass through, while the other of the two slots is completely open, that is to say constantly has the width of the narrow slot section which corresponds to the thickness of the bolt shaft.

An embodiment of the invention is further particularly preferred in which the corresponding rail section is provided with two slots arranged at a vertical distance apart one above the other, for example on an adaptor, which each have a widened part, wherein the two widened parts are the same distance apart as the head of the headed bolts on the corresponding opposite piece, and wherein the two slots are either connected together by a narrowed slot section which is narrower than the width of the headed bolt shafts, or by means of a narrow slot section which corresponds to this shaft width, wherein in the latter case a corresponding narrowed, open slot section must be arranged at the end of one of the two slots opposite the slot connection.

With the variant in which the two slots are connected together by means of a narrowed slot section, an embodiment is furthermore preferred in which parallel and adjacent to the slots, and in particular adjacent to the narrowed slot section joining the two slots, additional elongate apertures are provided in the rails provided with the slots, which increase the elasticity and the capacity for movement of the walls of the narrowed slot sections.

In the preferred embodiment of the invention, the rail provided with the narrowed slot area is manufactured from a fibre-reinforced plastics material, wherein preferably the pole receiver is also composed of the same material.

Figure 2:
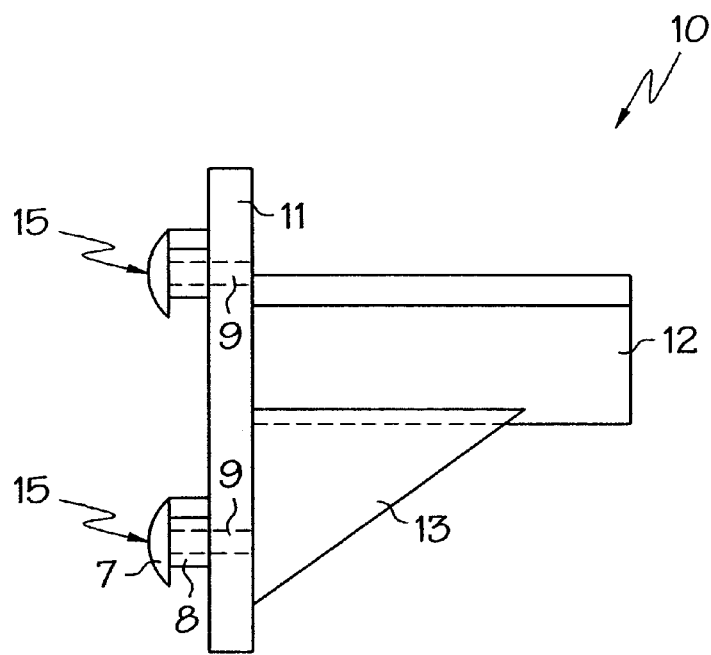
Figure 4:
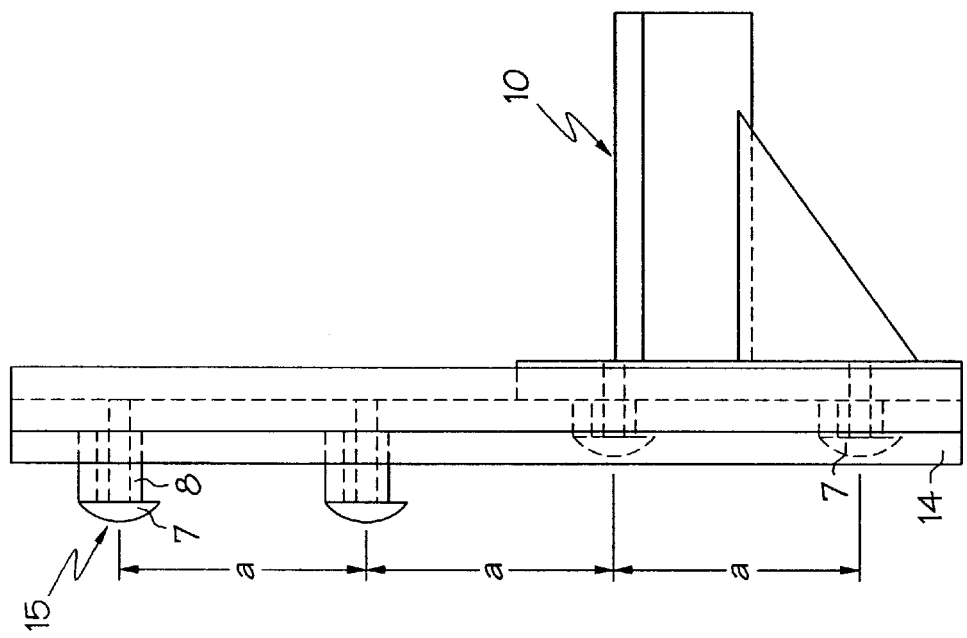
Figure 3:
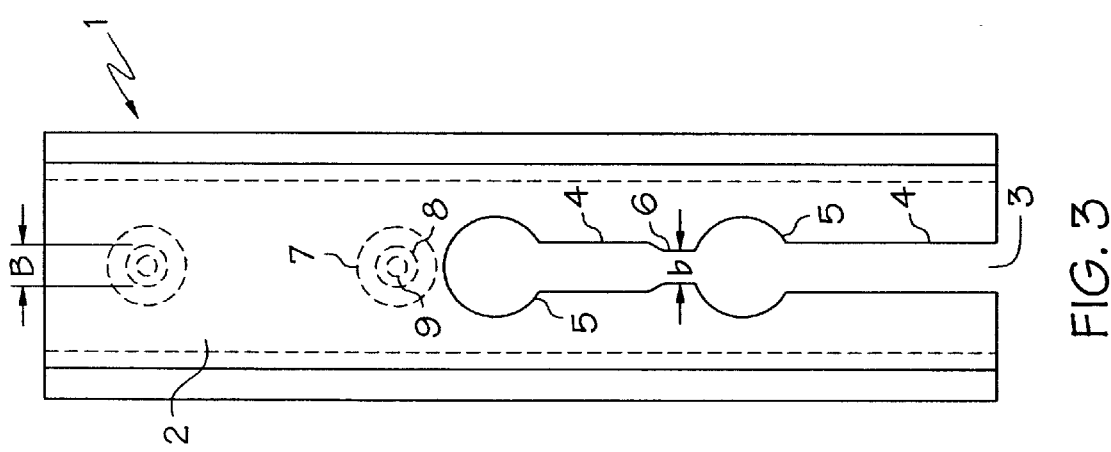
Figure 8A:
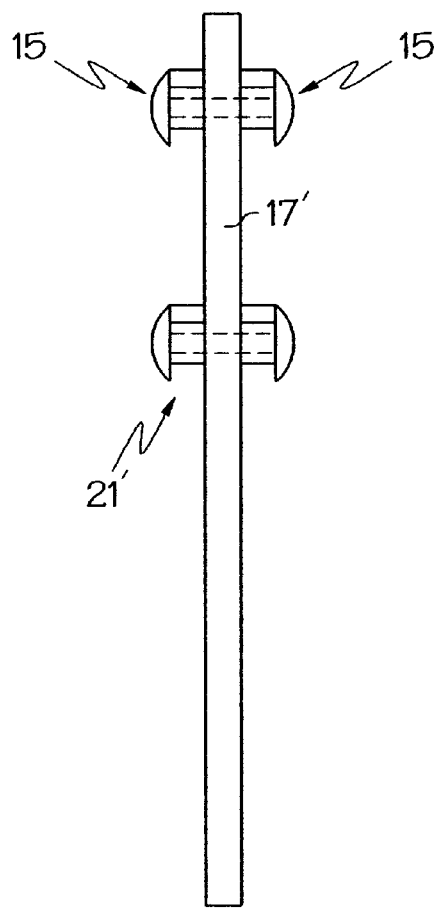
Figure 8B:
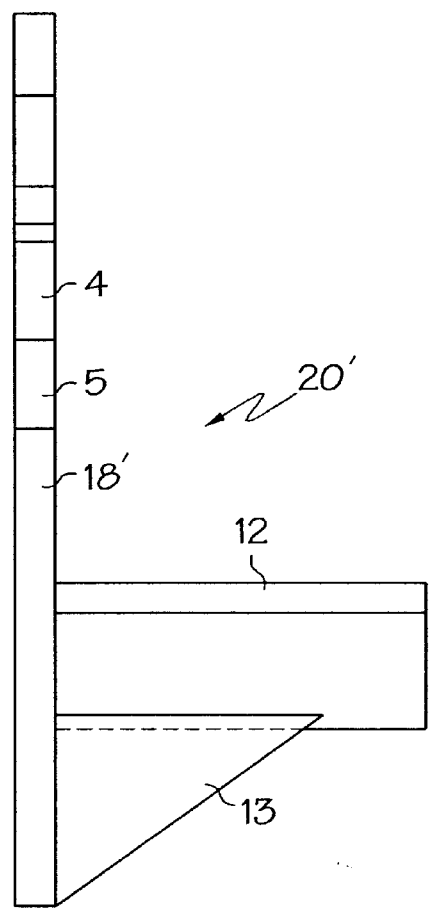
Figure 8C:
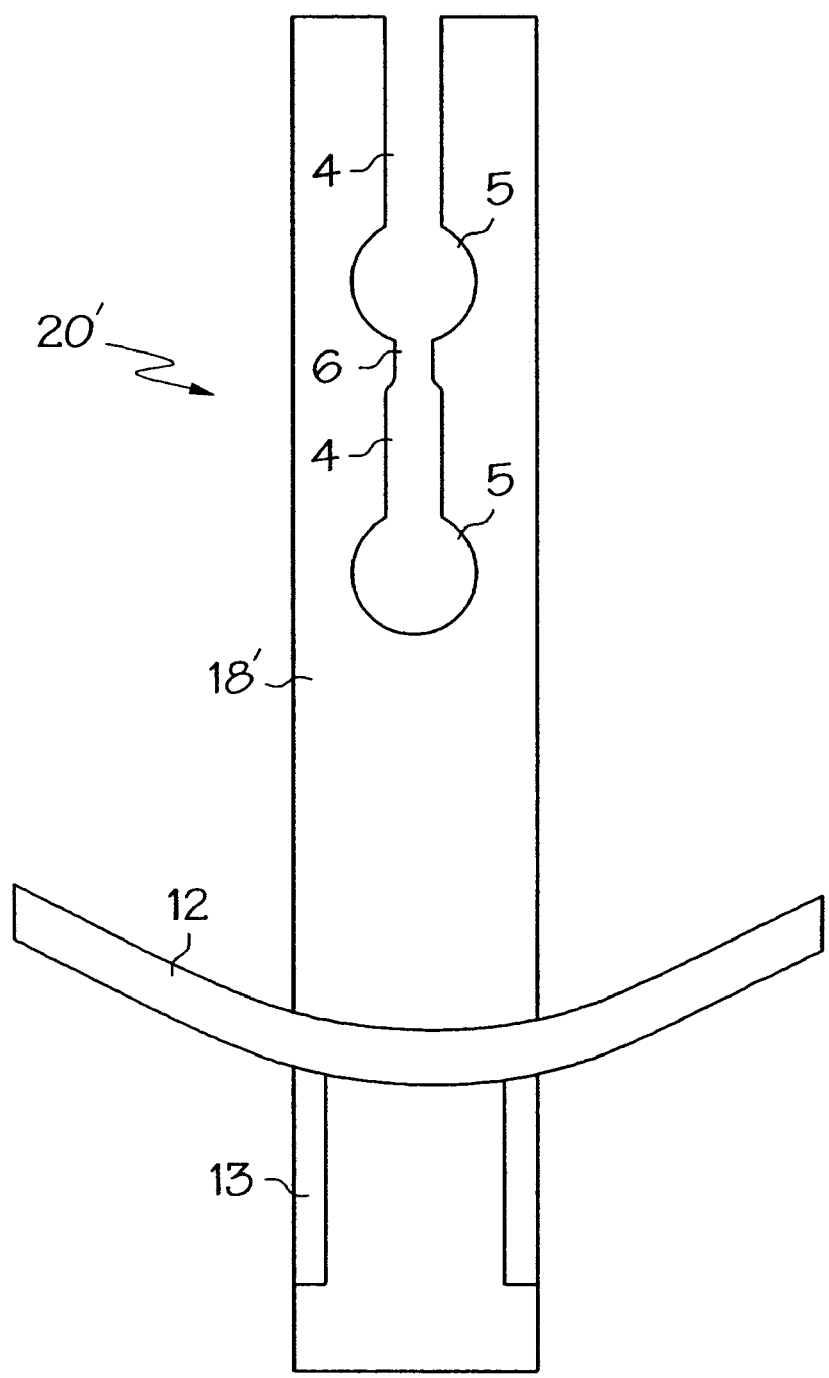

Further advantages, features and possibilities for application of the present invention will become apparent from the following description of a preferred embodiment and the attached drawings. In these is shown, in:

FIG. 1 a plan view from the front of a pole receiver,

FIG. 2 a side view of a pole receiver corresponding to a view of the receiver according to FIG. 1 from the left, FIG. 3 a front view of an adaptor rail, FIG. 4 a side view of an adaptor rail with a suspended pole receiver, FIG. 5 a plan view from above of an adaptor rail with a pole receiver corresponding to a view from above, rotated by 90°, of FIG. 4, FIGS. 6a–c different views and sectional views of an alternative adaptor rail, FIGS. 7a–c a further embodiment for a mounting according to the present invention, and FIGS. 8a–c again, a further embodiment of the present invention.

FIG. 1 shows a pole receiver 10, which is substantially composed of a concave supporting dish 12 and a bearing plate 11. Triangular supports 13 are provided laterally on the vertical bearing plate 11 in addition for supporting the concave supporting dish 12, particularly evident in FIG. 2. On the rear side of the bearing plate 11 two headed bolts 15 are provided vertically one above another and at a distance apart from one another, which are substantially composed of a bolt head 7 rounded on its outside, a bolt shaft 8 narrowed compared to the bolt head 7, and an inner bolt core 9. With the exception of the bolt core 9, the entire pole receiver 10 is manufactured in one piece and preferably from a fibre-reinforced plastics material, wherein the bolt core 9 is of metal, preferably of steel, and is integrated or embedded into the plastics material of the receiver. A pre-determined shearing force is defined for the bolt 15 by the bolt core 9.

As can be seen, the head 7 of the headed bolt 15 is configured flat and planar on its side facing towards the shaft, wherein the planar underside of the head 7 extends perpendicularly with respect to the bolt axis.

FIG. 3 shows the front view of an adaptor rail which is configured U-shaped or H-shaped in cross-section, wherein a continuous slot 3 in the lower part of the adaptor rail is evident from the front view, which is composed from two narrow slot parts 4 which are arranged vertically one above the other and aligned with one another in the longitudinal direction of the rail, have on their upper ends an approximately circular widened part 5 of the slot, and are connected together by means of a slot section 6 narrowed further with respect to the narrow slot part 4. The upper slot is thus composed of a widened part 5 of the slot arranged right at the top, a narrow slot section 4 following on below it, and a narrowed slot section 6. following below that, the lower, open end of which directly merges into the widened part 5 of the slot arranged below it, below which only one further narrow slot section 4 follows, which is downwardly, open without any further narrowing, although in this case too, a further narrowing 6 of the slot could be provided.

As is evident in FIG. 4, two headed bolts are again provided on the rear side of the adaptor rail, which are identical to the headed bolts of the pole receiver already described with reference to FIGS. 1 and 2. In FIG. 3, the position of these headed bolts and their individual parts is indicated by dashed lines. The dimensions of the distance apart of the headed bolts on the rear side of the adaptor rail 1 is in any case identical with the dimension of the corresponding slots, closed at their lower end, of the receiving rails of a stand (at least of the widened parts). Such a receiving rail, which is not shown here, generally has a large number of slots arranged vertically below one another in the dimensions described, which slots differ only from the slot 3 and slot parts 4, 5 in that they are not connected together by means of a narrowed slot section 6, but instead this narrowed slot section 6 is replaced by a closed wall.

The transition from the narrow slot part 4 into the still narrower slot section 6 can be configured in different ways. It can, for example, be partly circular, or substantially planar slot walls inclined towards one another can be provided here. The shaft cross-section of the bolt does not have to be circular, but instead can, for example, be matched to the transition described or have a cross-section independent thereof. The heads of the headed bolts also do not have to be circular in plan view, but can have any shape matching the widened part and/or the delimiting slot part 4, for example be provided in addition with a nose projecting into the narrow slot, section 4 which imposes a specific relative alignment between the headed bolt and slot or between the pole receiver and rail.

The dimension of the slots and widened slot parts 5 on the front side of the adaptor rail again corresponds exactly in this embodiment to the dimension of the headed. bolts on the rear side of the pole receiver, wherein, however, this dimension does not necessarily have to correspond to the dimension of the headed bolts on the rear side of the adaptor rail 1. When this dimension is made to correspond, it has the advantage that any conventional pole receivers could be used to suspend them in an the adaptor rail instead of in a stand rail. This should only occur, however, when the bolt shafts 8 of the headed bolts have an appropriate unit size, so even when conventional pole receivers are used, the desired flexibility of the narrowed slot section 6 is provided at the pre-determined limit of force.

If, however, this shaft diameter or the forces of friction between shafts and slot walls varies, it can be more advantageous to provide a size for the distance between the widened parts 5 on the rail adaptor and the corresponding distance of the headed bolts on the rear side of the pole receiver, which differs from the dimension of the headed bolts 15 on the rear of the receiving rail and the corresponding dimension of the widened parts on the rails of a stand so that essentially only the exactly matched pole receivers 10 and adaptor rails 1 can be used in combination with one another.

FIG. 5, which corresponds to a plan view from above of FIG. 4, again shows the U-shaped cross-section of the adaptor rail 1, which consists of the U-profile 2 on the rear of which two spacer rails 14 are again moulded or welded. The height of these spacers 14 is measured such that the heads 7 of the headed bolts of the pole receiver 10 can be received in the intermediate space between the spacer rails 14 when the heads 7 of the headed bolts 15 on the rear side of the adaptor rail 1 are suspended in a corresponding rail of a stand. FIG. 4 clearly shows that the heads 7 of the headed bolts 15 of the pole receiver 10 do not project over the rear edge of these spacer rails 14.

Figure 6B:
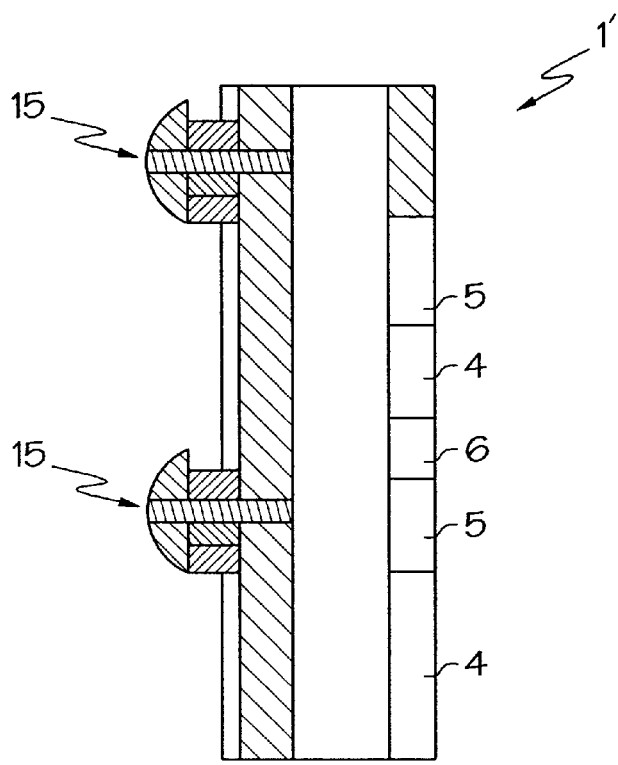
Figure 6C:
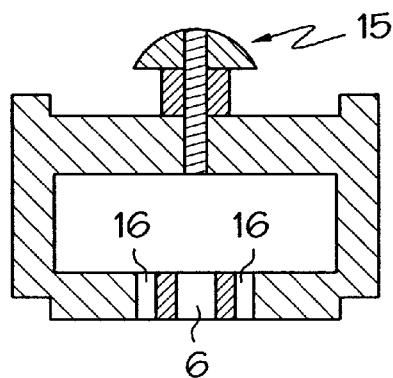

FIGS. 6a to c show a variant 1' of an adaptor rail, which in the present instance has a box-shaped profile. FIG. 6a shows the plan view from the front of the adaptor rail 1, analogous to the plan view according to FIG. 3 of the adaptor rail. 1. As is evident, in addition to the two receiving slots 4 arranged one above the other for the headed bolts 15 of a pole receiver 10, two additional slots or elongated apertures 16 are provided parallel to the slot section 6, which should facilitate the elastic flexibility of the narrowed slot section 6 which connects the upper and lower slot together. The result of this embodiment is that during the widening of the narrowed loaded headed bolt shaft, the material of the adaptor rail is stressed less than could occur in the embodiment shown in FIGS. 3 and 4.

Moreover, because of its box-shaped cross-section, the adaptor rail shown in FIGS. 6a–c has the advantage that it can be manufactured shorter than the rail shown in FIGS. 3 to 5 as the headed bolts 15 are arranged on the rear side of the adaptor rail 1' on the rear wall of the box profile, and consequently can be arranged vertically at the same height as the slots provided in the front wall of the box-shaped profile. The lines of intersection which show the positions of the section planes shown in FIGS. 6b and 6c are indicated by dashed lines B—B and C—C.

FIGS. 7 and 8 each show an embodiment in which the pole receiver which here is labelled as a whole as 20 and respectively 20', in the form of a piece of rail with a spreadable slot. In order to also be able to suspend this pole rail on conventional stands, a headed bolt adaptor 21 and respectively 21' is provided in each instance. The conventional stands have slots with widened parts in which the headed bolt adaptor can be suspended with two headed bolts 15 arranged one above another, which are located on one side of a plate 17.

On the opposite side, preferably identical headed bolts 15 are provided at a distance apart which corresponds to the distance apart of two widened parts 5 of a corresponding rail 18 on a pole receiver 20 (see FIGS. 7b, 7c). As already mentioned, the distance apart of the headed bolts 15 on the two sides of the headed bolt adaptor 21 could be different, wherein the distance apart on the one side matches the corresponding distances apart of the widened parts of the slots on a rail, while the distance apart of headed bolts on the other side should correspond to the distance apart of the widened parts 5 of the slots on the rail section 18.

In this case too, the headed bolts do not have an exactly circular cross-section, but instead a widened part in the direction of the slot which indicates a specific orientation of the headed bolt adaptor 21.

The pole receiver 20 is either configured as flat material bent in a U-shape, or also can have a box-shaped profile in cross-section in a manner analogous to FIG. 6c. Appropriate parallel elongated apertures 16 are then possibly necessary, however, in order to make possible the widening of the narrowed slot section 6 with the predetermined force.

FIG. 7c shows a section through the pole receiver 20 along the line C—C in FIG. 6b. As is evident, the configuration of the slits is practically identical to the configuration of the slots in the previously described embodiment according to FIGS. 3 and 4.

The embodiment according to FIG. 8 differs from the embodiment according to FIG. 7 substantially only in that the pole receiver 20' is not manufactured bent in a U-shape or as a box profile, but instead from a planar flat material 18', wherein the dish-shaped pole support 12 with the braces 13 is offset in the longitudinal direction with respect to the slots, in order to avoid any interference between the pole support 12 and the slots and respectively the headed bolts 15 inserted in the slots, even when it was possible in principle to configure the entire pole support such that the slits are arranged above and below the dish-shaped support 12.

The headed bolt adaptor 21' differs from the headed bolt adaptor 21 of FIG. 7 only in having a greater length in order to be able to offer a supporting surface corresponding to the length of the rear plate 18', composed of flat material, of the pole receiver 20'. Essentially, however, the adaptors 21 and 21' in the embodiments of FIGS. 7 and 8 could be interchangeable, or only a single type of headed bolt adaptor need be provided, for example the headed bolt adaptor 21', for both variants of pole receivers 20 or 20'.

What is claimed is:

1. A mounting for poles of jumps in equestrian sport, said mounting comprising:

a pole receiver for mounting said pole in a cradling fashion, said pole receiver comprising:
    a plate with at least two opposing surfaces;
    a supporting dish disposed on a first of said opposing surfaces; and
    a plurality of linearly-spaced first bolts fixedly mounted to a second of said opposing surfaces, each of said bolts comprising:
      a narrower shaft section; and
      a wider head section; and
  a generally vertical adapter rail for connecting said pole receiver to a stand, said adapter rail comprising:
    at least one vertically-extending slot with an open end commencing at one of the vertical ends of said rail, said at least one vertically-extending slot made up of a linearly-disposed series of alternating narrowed and widened segments, said alternating narrowed and widened segments including:
      a plurality of narrow portions, each with a width substantially equal to that of said shaft section of each of said plurality of linearly-spaced first bolts;
      a plurality of wide portions, each disposed adjacent at least one of said plurality of narrow portions and with a width at least as great as said head section of each of said plurality of linearly-spaced first bolts, and spaced apart from one another a distance substantially equal to the distance between said plurality of linearly-spaced first bolts;

a further narrow portion disposed between one of said plurality of narrow portions and one of said plurality of wide portions, said further narrow portion with a width less than said shaft section of each of said plurality of linearly-spaced first bolts; and a plurality of linearly-spaced second bolts disposed on a side of said adapter rail facing away from said pole receiver and toward said stand, said plurality of linearly-spaced second bolts adapted to fit into a dual closed-end slot disposed on said stand, each of said plurality of linearly-spaced second bolts comprising:
a narrower shaft section; and
a wider head section;

thereby creating, upon insertion of said wider head section of each of said linearly-spaced plurality of first bolts into respective said plurality of wide portions of said at least one vertically-extending slot, and subsequent placement of said shaft section in operative engagement with said further narrow portion of said at least one vertically-extending slot, such that said shaft is only moveable past said further narrow portion by overcoming a predetermined force acting co-linearly with the longitudinal axis of said at least one vertically-extending slot, and upon insertion of said wider head section of at least one second bolt into a portion of said dual closed-end slot of sufficient width to accept said wider head section, and subsequent placement of said plurality of linearly-spaced second bolts in a supportably disposed position relative to said stand, a mounted pole arrangement capable of breaking away from said stand upon application of said pre-determined force.

2. A mounting according to claim 1, wherein said plurality of linearly-spaced first bolts are spaced vertically apart.

3. A mounting according to claim 2, wherein said adapter rail has a box-shaped cross-section.

4. A mounting according to claim 3, wherein said spacing of said plurality of linearly-spaced second bolts differs from said spaced apart from one another distance of said plurality of wide portions of said at least one vertically-extending slot.

5. A mounting according to claim 2, wherein said adapter rail has a U-shaped cross-section.

6. A mounting according to claim 5, wherein said spacing of said plurality of linearly-spaced second bolts differs from said spaced apart from one another distance of said plurality of wide portions of said at least one vertically-extending slot.

7. A mounting according to claim 1, wherein said adapter rail further comprises at least one elongated aperture to facilitate elastic widening of said further narrow portion of said at least one vertically-extending slot.

8. A mounting according to claim 1, wherein said receiver and said adapter rail are manufactured from a fibre-reinforced plastics material.

9. A mounting according to claim 1, wherein said pole receiver further includes an upwardly projecting integral open end slot, said slot adapted to engage with a plurality of bolts projecting from a stand or adapter.

* * * * *